United States Patent
Kikinis et al.

(10) Patent No.: US 6,389,290 B1
(45) Date of Patent: *May 14, 2002

(54) ENHANCED WEATHER AND TRAFFIC INFORMATION FROM MOBILE COMMUNICATION DEVICES

(75) Inventors: Dan Kikinis, Saratoga; Rick DeGolia, San Francisco, both of CA (US)

(73) Assignee: Lextron Systems, Inc., Saratoga, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/609,629

(22) Filed: Jul. 3, 2000

Related U.S. Application Data

(60) Provisional application No. 60/145,482, filed on Jul. 23, 1999.

(51) Int. Cl.[7] .................................................. H04B 7/20

(52) U.S. Cl. ...................... 455/456; 455/414; 340/905; 701/200; 701/201

(58) Field of Search ................................ 455/456, 457, 455/414, 422, 517, 524, 425, 186.2; 340/905; 701/208, 209, 211, 213, 200, 201, 207

(56) References Cited

U.S. PATENT DOCUMENTS

| | | | | |
|---|---|---|---|---|
| 5,025,261 A | | 6/1991 | Ohta et al. | |
| 5,131,020 A | * | 7/1992 | Liebesny et al. | 340/905 |
| 5,383,128 A | | 1/1995 | Nishida et al. | |
| 5,548,789 A | * | 8/1996 | Behr et al. | 340/905 |
| 5,748,115 A | * | 5/1998 | Siegle | 340/905 |
| 5,802,492 A | * | 9/1998 | DeLorme et al. | 340/905 |
| 6,108,554 A | * | 8/2000 | Kawamoto | 455/456 |

\* cited by examiner

*Primary Examiner*—William Trost
*Assistant Examiner*—Simon Nguyen
(74) *Attorney, Agent, or Firm*—Donald R. Boys; Central Coast Patent Agency, Inc.

(57) ABSTRACT

A network based information system has a server or other source management system connected to the network and to an information database, and a portable communication device enabled to access the server on the network by keypad entry, and to indicate geographic position upon access. The system is characterized in that the keypad is graphically mapped for direction, and the server, in response to a call placed from the portable communication device, including keypad input indicating direction, accesses the database for information associated with the geographic position and the direction, and transmits that information to the portable communication device. Other criteria, such as distance and information type may also be mapped and used in retrieving information. In the case of voice-capable devices, information is rendered as speech to be transmitted to the communication device.

12 Claims, 2 Drawing Sheets

ENHANCED WEATHER AND TRAFFIC INFORMATION FROM MOBILE COMMUNICATION DEVICES

CROSS-REFERENCE TO RELATED APPLICATIONS

The present application claims priority to provisional application Ser. No. 60/145,482, filed Jul. 23, 1999. The prior application is incorporated in its' entirety by reference.

FIELD OF THE INVENTION

The present invention is in the field of Mobile Communication and has particular application to a system for acquiring weather and traffic information using a wireless communication device.

BACKGROUND OF THE INVENTION

It is often very important to obtain information, such as weather or traffic information, quickly and accurately while traveling. While driving in a car, for example, one may turn on certain radio stations in order to obtain information relevant to road conditions, traffic conditions and weather. Some services exist that allow users to access certain information with a telephone, either by means of IVR (Interactive Voice Response) or by accessing a telephone operator. Both may require a relatively lengthy negotiation in regards to pinpointing a specific point of geographic interest, such as a section of road that a traveler is approaching or expects to arrive at. As commonly known, specialized devices with Global Satellite Positioning (GPS) receivers are often used to indicate an individual's position within a geographical area. Using the GPS positioning, an operator may be able to provided more relevant data to the traveler that is specific to the then current location of the traveler.

Even with GPS equipment installed, which is quite expensive, a user may still have to communicate and negotiate for what type of data he or she requires from a given service. Moreover, it may be some time before relevant data is rendered available to an operator for relaying to the user. Another problem with an operator-controlled system may arise if there are language barriers preventing clear voice communication. In other cases, maps may be downloaded as well as text data, which may act to distract a user from his or her driving task. Moreover, the data relayed on the maps may be somewhat broad covering a larger region than a user requires information for.

What is clearly needed is a method and system which allows a user to quickly and easily obtain geographically specific accurate weather, traffic reports, and other pertinent information in a safe manner, while driving, without the use of expensive special equipment or having to contend with significant distraction.

SUMMARY OF THE INVENTION

In a preferred embodiment of the present invention a network based information system is provided, comprising a server or other source management system connected to the network and to an information database; and a portable communication device enabled to access the server or other source management system on the network by keypad entry, and to indicate geographic position upon access. The system is characterized in that the keypad is graphically mapped for direction, and the server or other source management system, in response to a call placed from the portable communication device, including keypad input indicating direction, accesses the database for information associated with the geographic position and the direction, and transmits that information to the portable communication device.

In some embodiments the system is additionally mapped for distance, and the server or other source management system uses both the distance and direction input in retrieving information from the database. In further embodiments the system is additionally mapped for information type, and the server or other source management system uses both the type and direction input in retrieving information from the database.

In some embodiments the portable communication device is a cellular telephone operating through a cellular service, and the cellular service forwards calls and geographic position to the server. In this case the server renders retrieved information as voice and transmits the voice information to the cellular telephone. The information provided can be of various sorts. In Preferred Embodiments the information comprises one or both of traffic and weather information.

In another aspect of the invention a method for providing position-based information to users of portable communication devices connectable to a network is provided, comprising the steps of (a) mapping a keypad of the portable communication device to indicate direction with key input; (b) enabling a server or other source management system coupled to the network to recognize the keypad mapping; (c) dialing up the server or other source management system by keypad input including input for direction, the communication device automatically providing position as well; (d) retrieving information from a database by the server or other source management system using the position and direction keypad input from the communication device; and (e) transmitting the information to the communication device by the server.

In some embodiments of the method, in step (a), the keypad is additionally mapped for distance, and the server uses both the distance and direction input in retrieving information from the database. In other embodiments, in step (a), the keypad is additionally mapped for information type, and the server uses both the type and direction input in retrieving information from the database. The keypad may be additionally mapped for information type, and the server uses the direction, distance, and type input in retrieving information from the database.

In some the portable communication device is a cellular telephone operating through a cellular service, and the cellular service forwards calls and geographic position to the server or other source management system. In this case the server or other source management system renders retrieved information as voice and transmits the voice information to the cellular telephone. Again, the information may comprise one or both of traffic and weather information.

In Preferred Embodiments of the invention described in enabling detail below, for the first time a quick and easy-to-use system is provided for travelers, in particular, to access information pertaining to such as weather and traffic.

BRIEF DESCRIPTION OF THE DRAWING FIGURES

DESCRIPTION OF THE PREFERRED EMBODIMENTS

As described in the background section, it is desired that relevant weather, traffic and other types of data be coordinated with a user's location such that the user may know certain conditions within a specified range and direction from the current position of the user when making a request. It is also desired that such information may be conveyed to users in a manner that is not distracting to the user, and with a minimum of input and negotiation. The inventor provides a unique service which according to various embodiments, provides efficient and dynamic information in near real time to mobile users operating wireless communication devices, such as cellular telephones.

Figure 1:
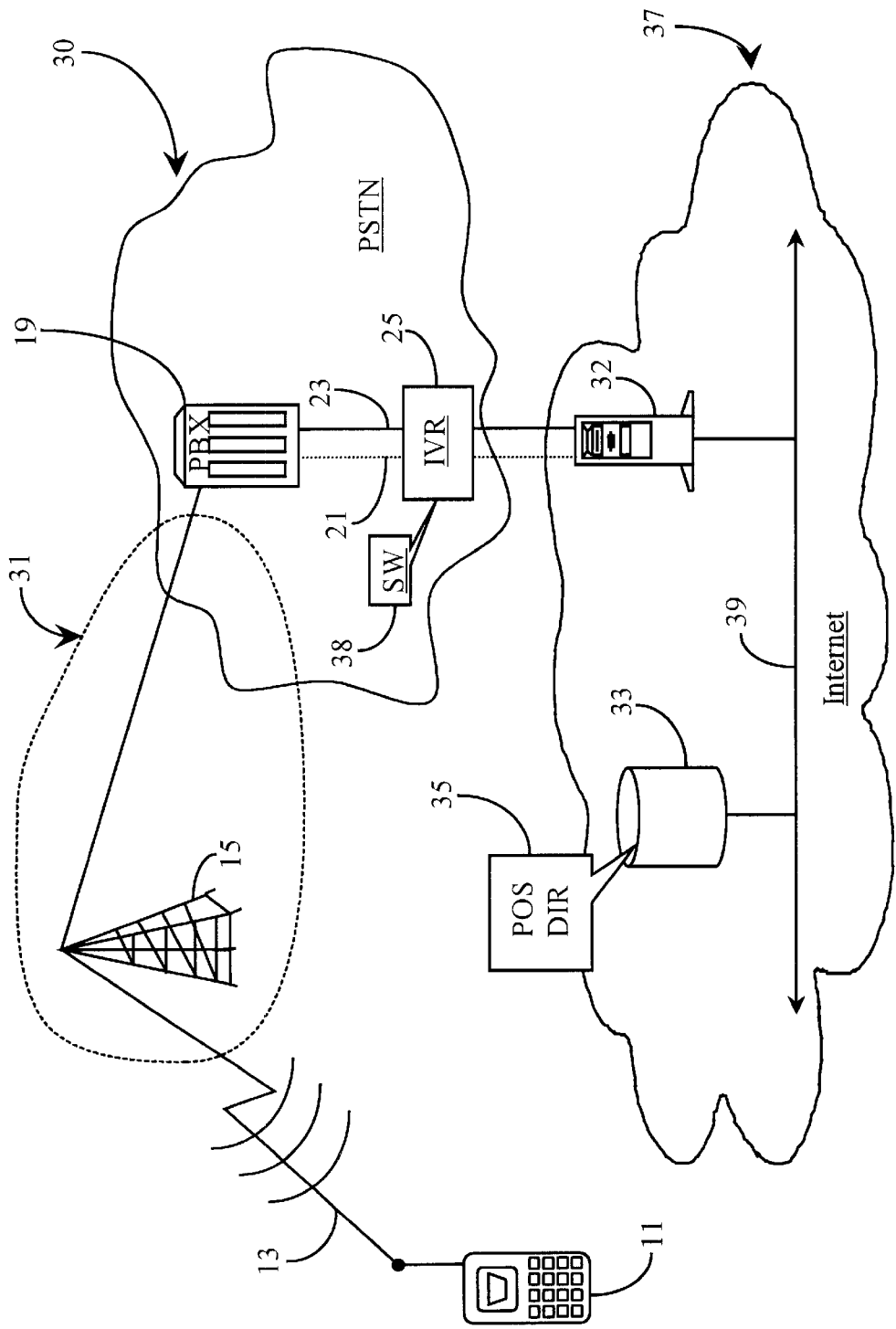
FIG. 1 is an overview of a communication system utilizing IVR technology in order to provide dynamic weather and traffic information according to an embodiment of the present invention.

FIG. 1 is an overview of a communication system utilizing IVR technology in order to provide dynamic weather and traffic information according to an embodiment of the present invention. This system comprises a wireless communication network 31, the well-known Internet network 37, a publicly switched telephone network (PSTN) 30, and an exemplary wireless communication device 11. Network 31, in this example, cooperates with a telephony switch 19 illustrated within PSTN 30, which in this example is a public branch exchange (PBX) by virtue of a network-gateway facility (not shown) as is generally known in the art. Communication device 11 communicates via a wireless connection represented herein as connection 13, through a communications tower 15 to PBX 19 when placing a call into PSTN 30. Tower 15 is illustrated as hardwired to PBX 19 and represents a network bridging facility into PSTN 30.

PBX 19 represents a variety of equipment that may be included within PSTN 30 as may be known in the art. For example, other types of telephony switches, routers, gateways and so on may be assumed to be present. PSTN 30 is a public network in this example, but in another embodiments a private or corporate telephony network may be used. The inventor chooses PSTN 30 as a preferred example because of a characteristic of public availability.

Internet 37, the well-known Internet, is chosen by the inventor as an preferred example for practice of the present invention for the same reason described above with respect to PSTN 30. In other embodiments, other wide-area-networks (WANs) such as company Intranets may be used. It is noted herein that use of the Internet or another data packet network of a wired nature is not specifically required to practice the present invention, however its inclusion enhances the functionality of the present invention.

A network server 32 is provided within Internet 37 and illustrated as connected to an Internet backbone 39, which represents all of the lines and connection points making up the global Internet network as a whole. Server 32 is adapted to function according to embodiments of the present invention as described later below. A data repository 33 is provided and illustrated as connected to backbone 39 and accessible to server 32. Repository 33 is adapted to store data relating to weather, traffic, user position data, and other data such as regional and local map information and the like. That may include but is not limited to information about businesses, restaurants, hotels, attractions, services, entertainment etc. Weather and traffic information as well as any other informational data may be obtained from a plurality of online weather and traffic information sources and is dynamic, that is, updated regularly through Internet communication. Any kind of storage, such as hard disks, optical disks, flash memory, RAM, or any other equivalent type of memory can be used to form such a Repository, and are well known in the art. Various other combinations of servers, appliances, networks, storage systems etc. are all well known and can be substituted easily.

A positional directory (POS DIR) 35 is provided within repository 33. Directory 35 temporarily stores user locations as reported by user's cellular service or other communication service through which the user may make contact with the system of the invention., in real time during request-calls for information. This positional process is discussed in more detail below. Directory 35 is a temporary directory containing user-positions associated with active requests. Server 32 functions to coordinate the appropriate requested information with user positions in order to provide relevant and current information to a requesting user.

An Interactive Voice Response System (IVR) 25 is provided and adapted to interact with a user operating device 11 by virtue of an instance of software (SW) 38. IVR 25 is illustrated as connected to both server 32 and to PBX 19 by a telephony line 23 and a logical data line 21 for illustrative purpose only. In actual practice, IVR 25 may be a functional part of PBX 19, or server 32 and lines 23 and 21 would connect, un-interrupted, server 32 and PBX 19. Interactive exchange between IVR 25 and a caller using device 11 is accomplished via voice recognition technology (VRT), which is well known in the art. IVR 25 is multi-taskable, meaning that it can interact with a plurality of callers according to a number of differing criteria. In this example, voice simulation resulting from text to voice software is used to provide voice-synthesized information to a caller. A caller may use a touch-tone method, or a voice-command method of interaction with IVR 21.

In practice of the present invention, a user operating device 11, which may be a cellular telephone, calls a special service number such as perhaps *11. *11, in this case, would be a special service number connecting to PBX 19. The call is routed over, in this case, cellular connection 13 to PBX 19 by virtue of tower 15. PBX 19 connects the call directly to IVR 25.

As is known in the art, wireless network services will be required to know the position of callers utilizing the network. This requirement is a legal requirement as mandated by the U.S. Congress. Using a pinging, triangulation, echo fingerprint, GPS or other equivalent technologies, wireless phone services can locate the position callers are dialing from within a short range, perhaps to an accuracy of a few feet, depending on the technology used. This requirement is mandated for emergency response purposes.

In this example, the technology described above used by cellular companies and others in wireless communication is used to determine a caller's relative geographic position, and, in response to the call number used by the wireless client, which indicates the call is to the IVR information service of the present invention, the cellular or other wireless service transmit the caller's position over line 21 in addition to the call on line 23, to server 32 where it is temporarily stored in directory 35 in repository 33. The actual call data is transmitted to server 32 over data-line 23. In one preferred embodiment, a single line may be used. The inventor chooses to illustrate two separate lines for illustrative purpose only.

Using device 11, a caller keys in a series of pre-defined commands using the standard phone-pad keys generic to device 11. These commands are equated with rules known in server 32. The rule or rules invoked in the server resulting from a call are applied to the current location of the caller to produce a voice response from IVR 25, which is a summary of current weather, traffic or other conditions that may exist at a specified range and direction from the callers location at the time of request. Examples of this interaction are provided in more detail below.

Once a call is sent to server 32 and the caller's location is established, the direction and range of the desired information is established. Using the keypad of device 11, a caller enters a certain series of numbers in order to transmit a desired command sequence and data. Upon receipt of the information from a caller at IVR 25, the information is sent to server 32 for processing. Server 32, then, based on user location stored in directory 35, direction, range, and type of information desired resulting from keypad entry during connection with IVR 21, calculates the desired area or areas of interest and the information to deliver. Server 32 then retrieves relevant data from data storage 33 or any other data sources, which may be available, and sends the data back to IVR 25. A message, in the form of synthesized voice, is then sent to the requesting user on device 11, which is still connected to PBX 19 and IVR 25. The voice message informs of traffic conditions, weather conditions, restaurant locations, or other information desired by the requesting caller, with the information related specifically to the distance and direction away from the caller's known position as ordered by the caller.

A wireless communications provider, a telephone carrier, an Internet company, or a combination of the above may host the service described above. Fees may be decided on according to any number of business criteria. For example, the service may be free to callers as long as they hear a voice advertisement before receiving the information. In one embodiment, a per-minute charge may apply. There are many possibilities.

It will be apparent to one with skill in the art that the service-architecture taught above may include many alterations or variations without departing from the spirit and scope of the present invention. For example, WCN 31 can be analog, digital, digital PCS, G3 or any other type of known wireless network. Device 11, may be a cell phone, handheld communicators, organizers with telephony capability, and so on. There are many architectural possibilities.

Figure 2:
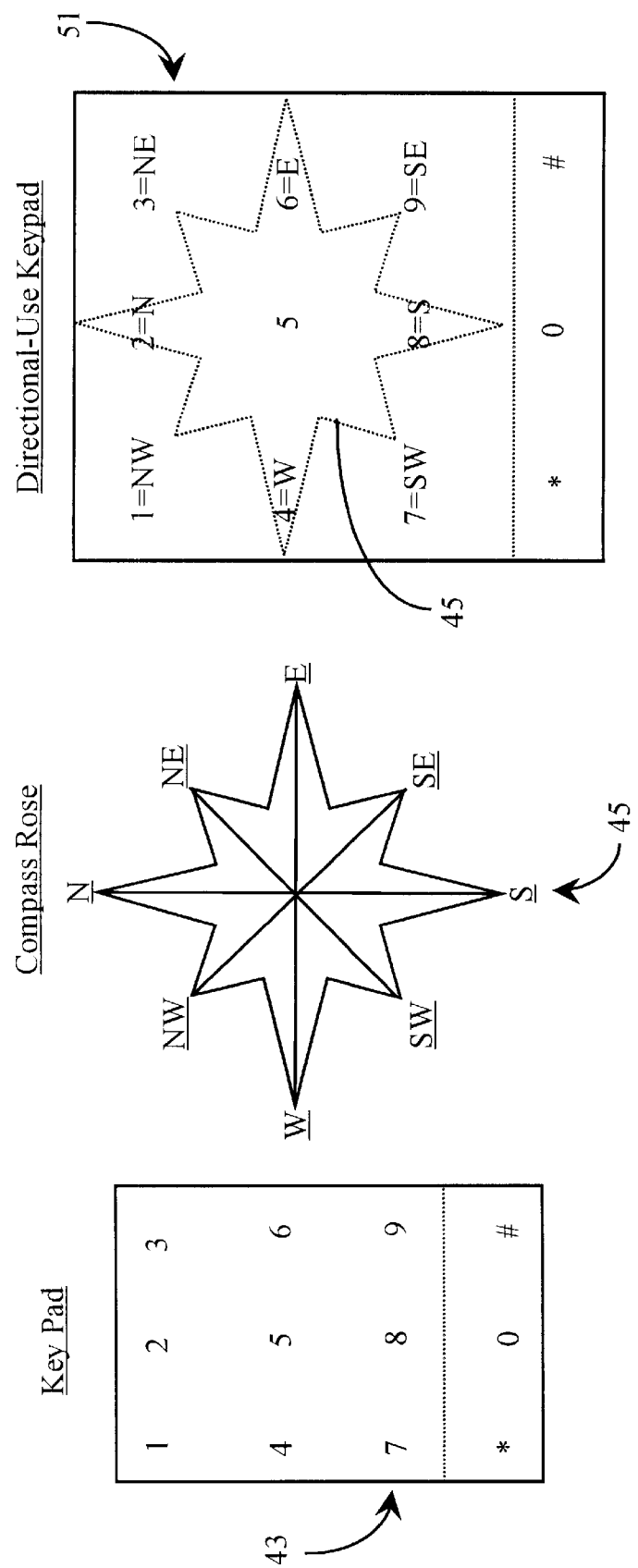
FIG. 2 is a block-diagram illustrating a telephone keypad, a wind rose, and a directional use keypad as used in a preferred embodiment of the present invention.

FIG. 2 is a block-diagram of a telephone keypad 43, a compass rose 45 and a directional-use keypad (DK) 51 respectively. Keypad 43 is a standard telephone keypad commonly found on both cellular and conventional telephones as well as many other communication devices. Compass rose 45, illustrated in the center-portion of FIG. 2, is used on maps or other directional devices. Compass rose 45 is a universally known icon for direction orientation. In this example, compass rose 45 exhibits the four primary directions, N, S, E, and W, as well as the four intermediate directions, NE, SW, NW, and SE.

Directional-use keypad (DK) 51 is a virtual combination of key pad 43 relating key arrangement to direction. DK 51 exhibits an imaginary position of compass rose 45 overlaid thereon, as is illustrated herein by a dotted boundary in the shape of compass rose 45. In this case, key-pad 51 has keys that are indicative for directions and commands. It should be noted that the association is made in IVR 25 (FIG. 1), not in the communication device, which continues to send the conventional signals associated with each key.

Using this scheme (relating keys to compass rose 45), the keys, when used after a call is placed to IVR 25, indicate directions, which enable callers to easily transmit directional data, such as the direction that they plan to travel.

In this example, if a caller is traveling northward and desires data relevant to that direction, number 2 on the keypad is invoked once. If a caller is traveling southward and desires data relevant to that direction, then number 8 may be entered once. All eight directions may be communicated by invocation of respective assigned keys.

Numeric entry is also used in order to communicate the approximate range in any given direction for which a caller desires information. An approximate range may include such as immediate, intermediate or long-distance parameters. For example, short range may be equated to 0–5 miles distant from a user's reported location. Intermediate range may be equated to 5–10 miles, and long distance may include any distance over 10 miles. There are limitless applications of such a distance rule. Applying the above-stated rule, a caller may repeat entry of a same directional key to denote immediate range. A third repetition may indicate an intermediate range, and a fourth may indicate long distance.

Using the above exemplary scheme, keying 22 denotes a direction of north and an immediate range (0–5 mi.). Keying 222 denotes a direction of north and an intermediate range (5–10 mi.). Keying 7777 denotes a direction of SW and a long distance range (10+ mi.). The standard # and * signs, generic to keypad 51 may be assigned as enter commands signifying the type of data desired such as weather for # and traffic conditions for*. The 0 may indicate any food and lodging sources present and the number 5 may denote any auto-service resources in the area. There are many configuration possibilities. The inventor intends that the use example presented above reflect just one of many possible schemes. Again, it is important to understand that the relation of keying sequences to data and commands is a software function in IVR 25, understood by the caller.

Because the service described in this specification is unique and dedicated, a complete request could be delivered during the initial stage of dialing, the request simply including the access number at the beginning of the dialing sequence. For example, instead of first dialing *11 and then waiting to be connected to IVR 21, a caller may simply dial *11222* to gain access to the service, transmit the request (222*), and quickly receive traffic conditions for a direction of north of his/her present location for a distance of 10+ miles. Further to the above, a caller might dial *11222*22# and therefore quickly receive both weather and traffic information, as well as other information subscribed to and or requested for the entered ranges of the entered direction. In the second example, the caller wants traffic conditions due north at a range of 5–10 miles (222*) and weather information for the same direction at a range of 0–5 miles (22#). It will be apparent to one with skill in the art that a caller may, if desired, check conditions peripherally around him or her in one dialing. Other numbers or spelling of words or partial words may be used. For example looking for a restaurant in the 0–5 mile range north of his current location would be requested as (22737*), where 737 spells "RES" on the phone key pad. Further details may be then inquired by interactively querying through an IVR, with either numeric, alpha or voice input.

It will further be apparent to one with skill in the art that other embodiments may be produced without departing from the spirit and scope of the present invention. For example, other schemes may be devised to formulate directional keys. Additionally, other information or reports may be obtained by use of the present system. Therefore, the method and apparatus of the present invention should be afforded the broadest possible scope under examination. The spirit and scope of the present invention is limited only by the claims that follow.

What is claimed is:

1. A subscription information system, comprising:

a cellular telephone operating through a wireless cellular service to a public service telephone network (PSTN);

an Interactive Voice Response (IVR) Server with a dedicated access number connected to the PSTN and recognizing a limited number of preprogrammed information types; and an information server connected to the IVR, the information server storing and updating information pertaining to the limited number of information types according to geographic location;

characterized in that the cellular service receives with an incoming call an indication of the telephone's geographic location, recognizes a first portion of an input dialing string to connect an incoming call to the IVR, sending the location along with the call, and the IVR recognizes a second portion of the dialing string to select among the limited number of information types, and a third portion of the dialing string to recognize direction and distance from the telephones position, calculating a new position, sending the new position to the information server with the information type, and the information server provides information according to the information type for the new position to the IVR, which provides the information to the telephone through the cellular service.

2. The information system of claim 1 wherein the information server is an Internet server, and the IVR is Internet-connected, communicating with the information server over the Internet.

3. The information system of claim 1 wherein the preprogrammed information types are traffic information and weather information.

4. The information system of claim 1 wherein the information provided by the information server is analog voice format.

5. The information system of claim 1 wherein the information provided by the information server is converted at the IVR to analog voice format for transmission to the cellular service.

6. The information system of claim 1 wherein the keyboard of the cellular telephone is mapped to facilitate input of the second and third portions of the dialing string.

7. A method for providing location-based information to users of cellular telephones operating through a cellular service, comprising the steps of:

(a) receiving a dialing string and an indication of location from an individual one of the cellular telephones;

(b) recognizing by the cellular service a first portion of the input dialing string to connect an incoming call to the IVR;

(c) recognizing by the IVR a second portion of the input dialing string to select among a limited number of preprogrammed information types, and a third portion of the input dialing string to indicate a direction and distance, calculating therefrom a new location;

(d) providing the information type and new location to the information server; and (e) selecting information by the information server for provision to the IVR, and back to the cellular telephone, according to the information type and the new position.

8. The method of claim 7 wherein the information server is an Internet server, and the IVR is Internet-connected, communicating with the information server over the Internet.

9. The method of claim 7 wherein the preprogrammed information types are traffic information and weather information.

10. The method of claim 7 wherein the information provided by the information server is analog voice format.

11. The method of claim 7 wherein the information provided by the information server is converted at the IVR to analog voice format for transmission to the cellular service.

12. The method of claim 7 wherein the keyboard of the cellular telephone is mapped to facilitate input of the second and third portions of the dialing string.

* * * * *